(12) United States Patent
de Capoa et al.

(10) Patent No.: US 11,500,686 B2
(45) Date of Patent: Nov. 15, 2022

(54) RESOURCE MANAGEMENT OF A SOFTWARE APPLICATION WITH MULTIPLE SOFTWARE COMPONENTS

(71) Applicant: INTERNATIONAL BUSINESS MACHINES CORPORATION, Armonk, NY (US)

(72) Inventors: Gabriele de Capoa, Rome (IT); Massimo Villani, Rome (IT)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 16/944,197

(22) Filed: Jul. 31, 2020

(65) Prior Publication Data

US 2022/0035668 A1 Feb. 3, 2022

(51) Int. Cl.
*G06F 9/50* (2006.01)
*G06F 11/34* (2006.01)
*G06F 11/30* (2006.01)

(52) U.S. Cl.
CPC ............ *G06F 9/505* (2013.01); *G06F 11/302* (2013.01); *G06F 11/3433* (2013.01); *G06F 11/3442* (2013.01); *G06F 11/3447* (2013.01)

(58) Field of Classification Search
CPC .... G06F 9/505; G06F 11/302; G06F 11/3433; G06F 11/3442; G06F 11/3447
See application file for complete search history.

(56) References Cited

U.S. PATENT DOCUMENTS

| | | | |
|---|---|---|---|
| 8,972,986 B2 | 3/2015 | Palanisamy et al. | |
| 9,003,416 B2 | 4/2015 | Gangemi et al. | |
| 9,450,838 B2 | 9/2016 | Jain et al. | |
| 10,339,131 B1* | 7/2019 | Dolas | G06F 16/182 |
| 10,360,012 B2 | 7/2019 | De Gaetano et al. | |
| 11,018,991 B1* | 5/2021 | Vishwakarma | H04L 67/1097 |
| 2004/0148152 A1* | 7/2004 | Horikawa | G06F 11/3466 703/22 |
| 2007/0203856 A1 | 8/2007 | Frohnhoefer | |

(Continued)

FOREIGN PATENT DOCUMENTS

| CN | 102445980 A | 5/2012 |
|---|---|---|
| CN | 108255671 A | 7/2018 |

(Continued)

OTHER PUBLICATIONS

Notification of Transmittal of the International Search Report and the Written Opinion of the International Searching Authority, or the Declaration, International application No. PCT/IB2021/056878, dated Nov. 9, 2021, 8 pages.

Khazaei, et al., "Performance Modeling of Microservice Platforms Considering the Dynamics of the underlying Cloud Infrastructure," arXiv:1902.03387v1 [cs.DC] Feb. 9, 2019, https://arxiv.org/pdf/1902.03387.pdf, pp. 1-15.

(Continued)

*Primary Examiner* — Jorge A Chu Joy-Davila
(74) *Attorney, Agent, or Firm* — L. Jeffrey Kelly

(57) ABSTRACT

A solution is proposed for resource management of a software application including a plurality of software components interacting with each other. A corresponding method includes monitoring present conditions of the software components and estimating a future consumption of one or more computing resources by each software component from the present conditions of the software components; an allocation of the computing resources to the software components is then controlled accordingly. A computer program and a computer program product for performing the method are also proposed. Moreover, a system for implementing the method is proposed.

16 Claims, 9 Drawing Sheets

(56) References Cited

U.S. PATENT DOCUMENTS

| | | | | |
|---|---|---|---|---|
| 2012/0079497 | A1* | 3/2012 | Gangemi | G06F 9/5011 |
| | | | | 718/104 |
| 2012/0331113 | A1* | 12/2012 | Jain | H04L 67/1008 |
| | | | | 709/220 |
| 2013/0179893 | A1 | 7/2013 | Rashed | |
| 2016/0269239 | A1* | 9/2016 | Ashby, Jr. | H04L 43/0876 |
| 2019/0058761 | A1 | 2/2019 | Hassan | |
| 2019/0171447 | A1 | 6/2019 | Lepcha | |
| 2019/0173286 | A1* | 6/2019 | Ilic | G06Q 10/06315 |
| 2020/0218571 | A1* | 7/2020 | Chen | G06F 9/5083 |
| 2020/0380351 | A1* | 12/2020 | Verma | G06F 11/3409 |
| 2021/0303985 | A1* | 9/2021 | Lakshmikantha | G06N 3/0445 |

FOREIGN PATENT DOCUMENTS

| | | |
|---|---|---|
| CN | 109002358 A | 12/2018 |
| WO | 2022024006 A1 | 2/2022 |

OTHER PUBLICATIONS

Lewis, "Microservices", a definition of this new architectural term, Mar. 25, 2014, https://martinfowler.com/articles/microservices.html, pp. 1-24.

Rahman, et al., "Predicting the End-to-End Tail Latency of Containerized Microservices in the Cloud," 2019 IEEE International Conference on Cloud Engineering (IC2E), https://ieeexplore.ieee.org/abstract/document/8790059, pp. 200-210.

* cited by examiner

RESOURCE MANAGEMENT OF A SOFTWARE APPLICATION WITH MULTIPLE SOFTWARE COMPONENTS

BACKGROUND

The present disclosure relates to the information technology field. More specifically, this disclosure relates to resource management of software applications.

Software applications require several computing resources for their running (such as processing, memory and network resources). The (resource) management of these computing resources plays a key role with respect to operation of the software applications; indeed, the resource management deeply impact performance, availability and cost of the software applications.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of estimating the resource consumption of each software component from conditions of the software components of the software application.

Particularly, an embodiment provides a method for resource management of a software application including a plurality of software components interacting with each other. A corresponding method includes monitoring present conditions of the software components and estimating a future consumption of one or more computing resources by each software component from the present conditions of the software components; an allocation of the computing resources to the software components is then controlled accordingly.

A further aspect provides a computer program for implementing the method.

A further aspect provides a corresponding computer program product.

A further aspect provides a corresponding system.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1A:
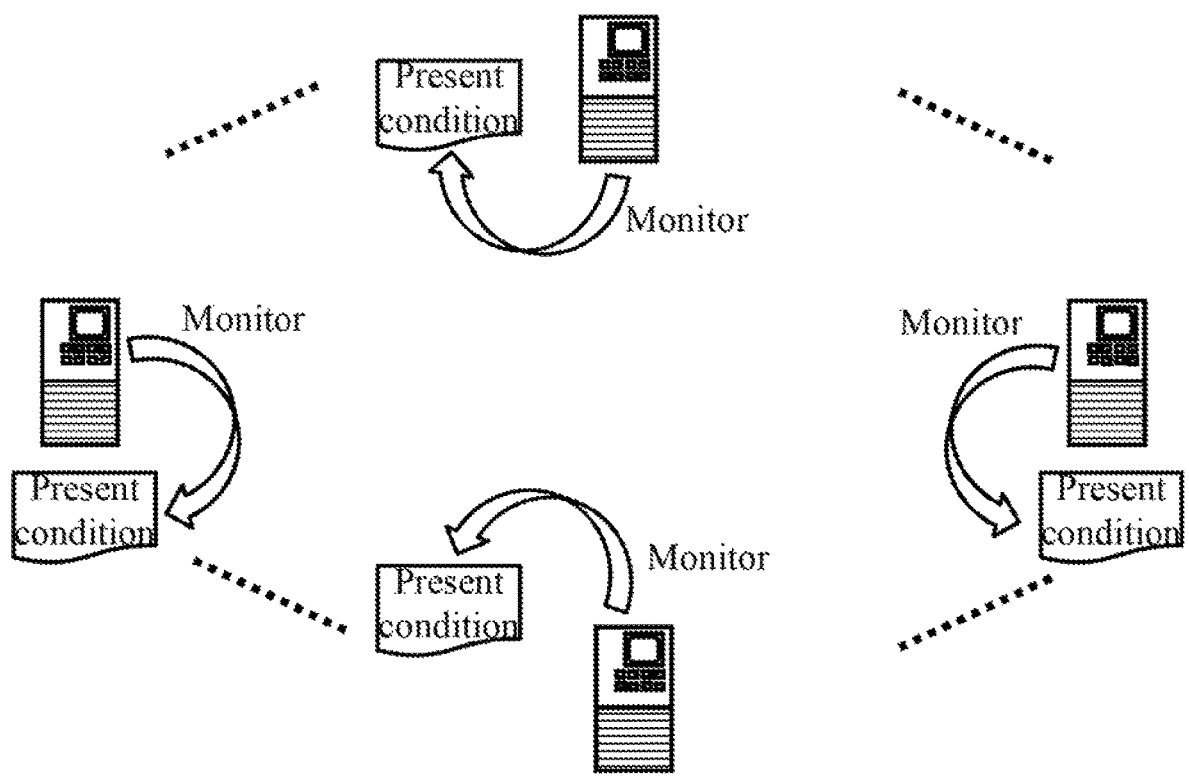
FIGS. 1A-1D show the general principles of the solution according to an embodiment of the present disclosure.

Software applications require several computing resources for their running, such as processing, memory and network resources. The resource management of these computing resources plays a key role with respect to operation of the software applications; indeed, the resource management deeply impact performance, availability and cost of the software applications.

The computing resources may be allocated to the software applications statically according to standard workloads thereof, for example, derived from historical information. However, this approach is completely ineffective in computing environments wherein the workloads are strongly variable over time (in a way that is not known a priori).

Alternatively, the computing resources may be allocated to the software applications dynamically according to their contingent needs. This is typical of virtualized computing environments, wherein the computing resources are of virtual type, i.e., emulation by software of physical computing resources, so that they may be allocated substantially in real-time (in a relatively fast way).

For this purpose, monitoring techniques may be used to monitor performance of the software applications, for example by measuring corresponding performance metrics over time. In this way, as soon as the monitored performance of any software application indicates that it has entered a critical condition, the allocation the computing resources to the software application may be updated accordingly to remedy it. However, the allocation of the computing resources may be updated only after the critical conditions have been detected; moreover, a certain time is required by any update to take effect. All of the above may cause delays for recovering the software applications from their critical conditions.

Alternatively, prediction techniques may be used to predict the resource consumption of the computing resources by the software applications. In this way, as soon as the predicted resource consumption of any software application indicates that it is expected to enter a critical condition in the near future, the allocation of the computing resources to the software application may be updated accordingly to prevent it. The prediction techniques are based on prediction models of the software applications, for example, depending on their present internal states; the prediction models may also be modified over time according to a workload of the software applications (so as to adapt thereto).

Many software applications are broken into multiple software components that interact among them. A typical example is in cloud (computing) environments. In this case, the software components of each software application generally implement corresponding services, and particularly micro-services; each service may invoke the other services of the software application (in addition to external services)

to provide the required functionality. This architecture provides modularity, increases scalability, facilitates integration and fosters cooperative development. Moreover, each software application may be deployed with one or more instances of its software components in different locations; this allows distributing the workload of the software application and it provides redundancy to increase reliability.

However, in this case the above-described prediction techniques are quite ineffective. Indeed, if the resource management is applied at the level of each software application as a whole, it is challenging to allocate the required computing resources throughout its software components, especially when they are distributed in different locations. Conversely, if the resource management is applied at the level of each software component individually, it is challenging to predict the resource consumption of the computing component, because of its correlation with the other software components of the same software application.

As a consequence, the computing resources may be not allocated correctly to the software components. Particularly, the computing resources may be over-provisioned; in this case, the computing resources in excess remain idle for most of the time (with a corresponding waste thereof, which may also involve useless costs in cloud environments when the computing resources are billed on a pay-per-use basis). Conversely, and more dangerously, the computing resources may be under-provisioned; in this case, the shortage of computing resources may cause performance degradation of the software application, down to its complete crash (which may be unacceptable in many practical situations, such as when a corresponding Service Level Agreement (SLA) has to be met).

With reference in particular to FIGS. 1A-1D, the general principles are shown of the solution according to an embodiment of the present disclosure.

Referring to FIG. 1A, a software application is shown; for example, the software application is of the cloud type (supplied as a service in a cloud environment by a corresponding cloud provider). The software application includes a plurality of software components running on one or more computing systems. For example, the software components implement corresponding services; each service provides a stand-alone functionality, independent of its implementation, which may be requested through a well-defined interface. Particularly, the services may be micro-services; each micro-service is relatively small in size, fine-grained (to perform a single function), independently deployable and accessible through a lightweight protocol (such as the HTTP).

In the solution according to an embodiment of the present disclosure, a present condition is monitored of each software component (for example, by monitoring one or more workload metrics thereof).

Figure 1B:
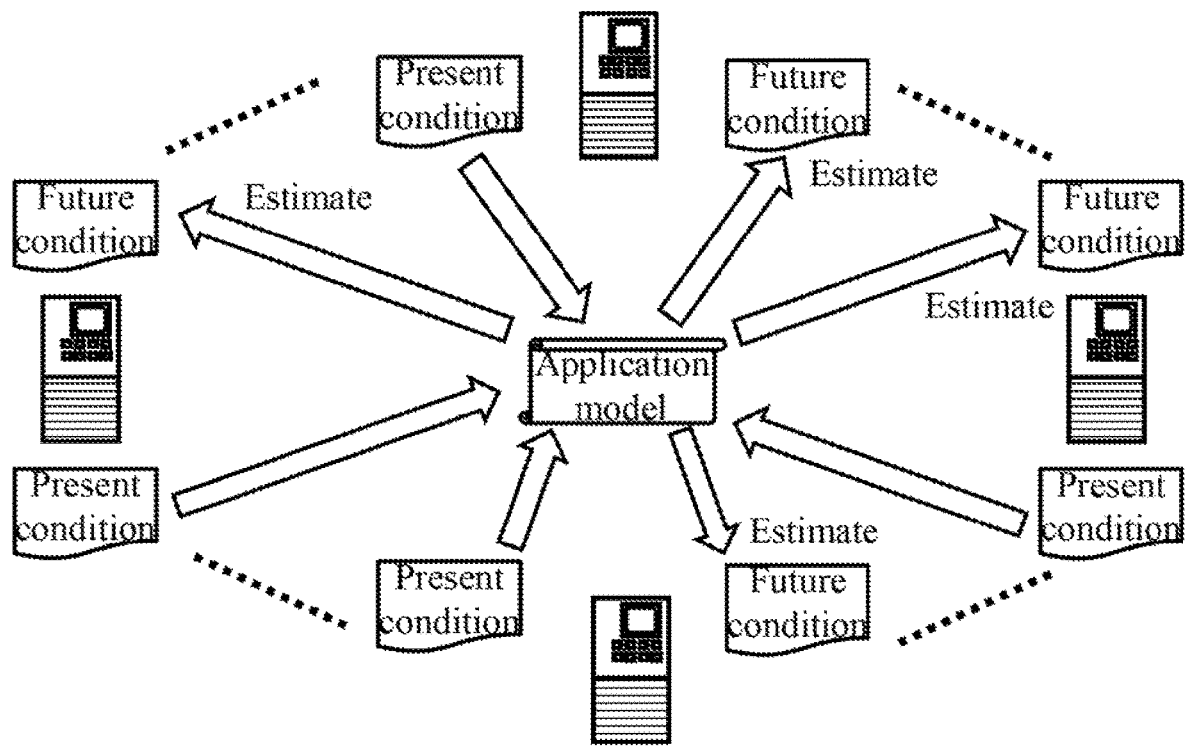

Referring to FIG. 1B, for each software component, corresponding future consumptions by the software component of one or more computing resources of the corresponding computing systems are estimated (at a next time, such as in a few minutes); the future consumptions of each software component are estimated from the present conditions of (all) the software components according to one or more estimation models. For example, in an embodiment a future condition of each software component (at the same next time as above) is estimated from its present condition according to an application model of the whole software application; the application model is based on correlations among the software components in the software application (as defined by their reciprocal invocations).

Figure 1C:
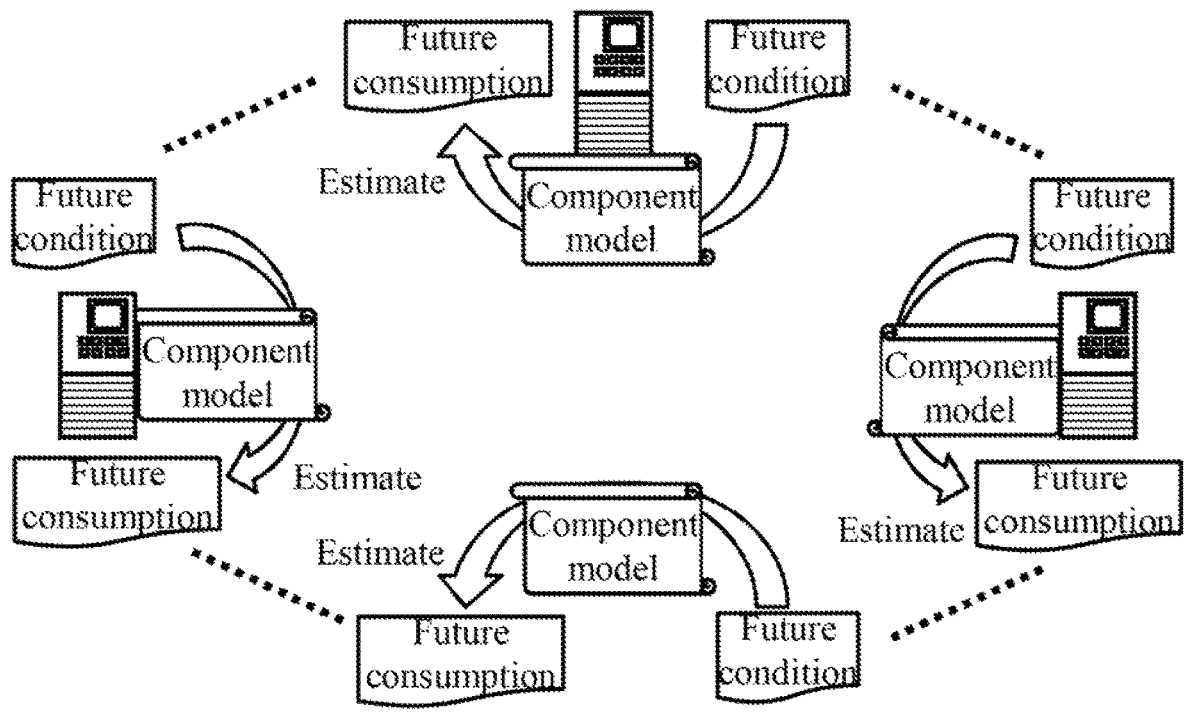

Referring to FIG. 1C, the future consumptions of each software component is then estimated from its future condition according to a component model of the software component.

Figure 1D:
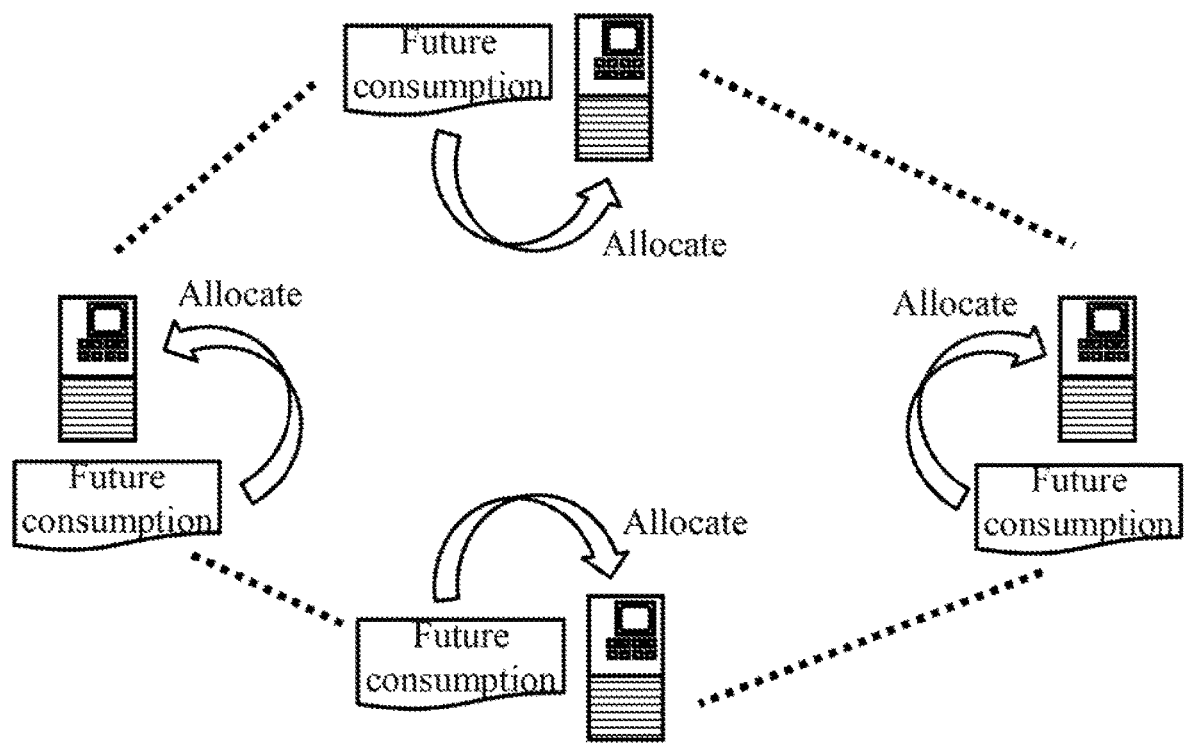

Referring to FIG. 1D, an allocation of the corresponding computing resources to the software components is controlled according to their future consumptions (for example, by increasing it when a future consumption is too high and reducing it when a future consumption is too low).

The above-described solution significantly improves the allocation of the computing resources to the software application throughout its software components (even when they are distributed in different locations). Particularly, the allocation of the software components is now applied individually to the software components (instead of monolithically to the software application); at the same time, the allocation of the software components is applied taking into account the correlations among the software components in the software application (instead of to each software component standing alone).

In this way, the risk of over-provisioning and especially of under-provisioning the computing resources to each software component is significantly reduced; this accordingly allows saving computing resources (and possible associated costs) and it allows absorbing workload peaks in most practical situations (with a beneficial effect on a service level of the software application).

As a result, a high degree of elasticity of the software application is obtained, with its software components that self-adapt to their variable workload automatically. Particularly, the allocation of the computing resources is performed proactively, so that it is possible to intervene in advance (generally before the occurrence of any critical condition).

This is particularly useful in dynamic environments, as typical of cloud environments, wherein the workload of the software application is variable over time in an unpredictable way.

Figure 2:
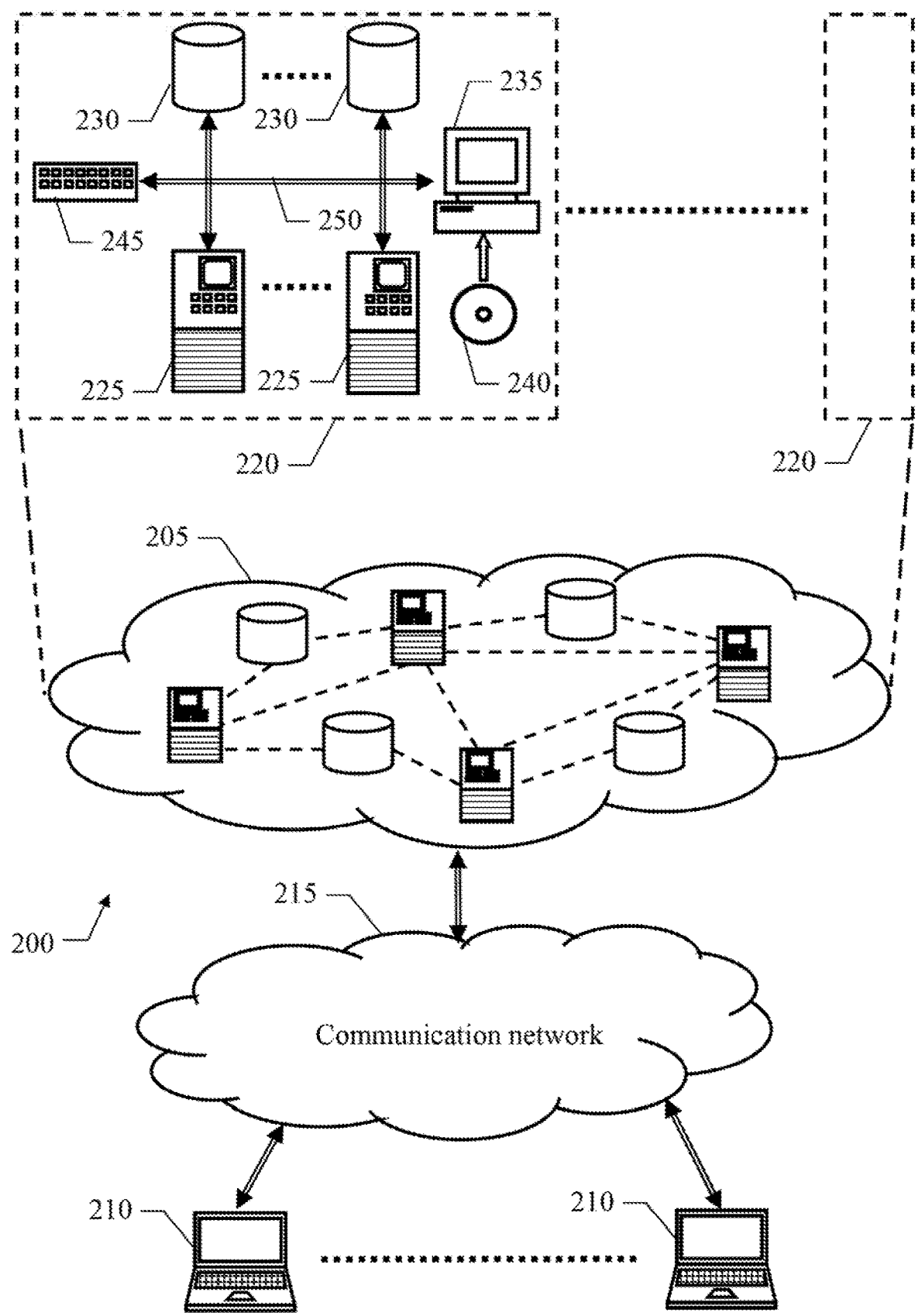
FIG. 2 shows a schematic block diagram of a computing infrastructure wherein the solution according to an embodiment of the present disclosure may be practiced.

Referring to FIG. 2, a schematic block diagram is shown of a computing infrastructure 200 wherein the solution according to an embodiment of the present disclosure may be practiced.

The computing infrastructure 200 includes one or more cloud providers 205 (only one shown in the figure). Each cloud provider 205 is an entity that provides a pool of computing resources as cloud services (i.e., shared computing resources that may be provisioned, configured and released very rapidly); the computing resources (generally of the virtual type, i.e., emulations by software of physical computing resources) are provided upon request to users of the cloud provider 205, so that each user has the sole control of the computing resources (which may then be used exactly as if they were dedicated to the user). The computing resources may be provided according to several service models, particularly, Infrastructure as a Service (IaaS), Platform as a Service (PaaS), Software As a Service (SaaS) and Network as a Service (NaaS). Moreover, the computing resources may be provided according to different deployment models, particularly, public cloud (i.e., for the general public), private cloud (i.e., for a single organization), community cloud (i.e., for several organizations) or hybrid cloud (based on a combination of different deployment models). Particularly, as far as relevant to the present disclosure, the computing resources may be allocated to the software components (implementing corresponding micro-services) of each software application of the users.

The users connect to the cloud provider 205 with corresponding client computing machines, or simply clients, 210

(for example, of the thin type) via a (communication) network 215; for example, the network 215 may be the Internet for a public/community cloud or a LAN for a private cloud. For this purpose, the cloud provider 205 exposes a front-end component for accessing it (for example, via a web browser of the clients 210); the front-end component interfaces with a back-end component actually implementing the micro-services (which back-end component is not accessible from the outside, so that the users are completely agnostic about its location and configuration).

The cloud provider 205 is implemented in one or more server farms 220. Each server farm 220 includes multiple server computing machines, or simply servers, 225 (for example, of the rack or blade type) and multiple storage disks 230 (for example, of the RAID type) implementing mass-memories thereof; in turn, each server 225 includes (not shown in the figure) one or more microprocessors (μP) providing a logic capability of the server 225, a non-volatile memory (ROM) storing basic code for a bootstrap of the server 225 and a volatile memory (RAM) used as a working memory by the microprocessors. The server farm 220 also includes a console 235 for controlling it (for example, a personal computer, also provided with a drive for reading/writing removable storage units 240, such as optical disks like DVDs). A switch/router sub-system 245 manages any communications among the servers 225, the disks 230 and the console 235, and with the network 215; for this purpose, the servers 225, the disks 230 and the console 235 are connected to the switch/router sub-system 245 (thanks to corresponding network adapters) via a cabling sub-system 250.

Figure 3:
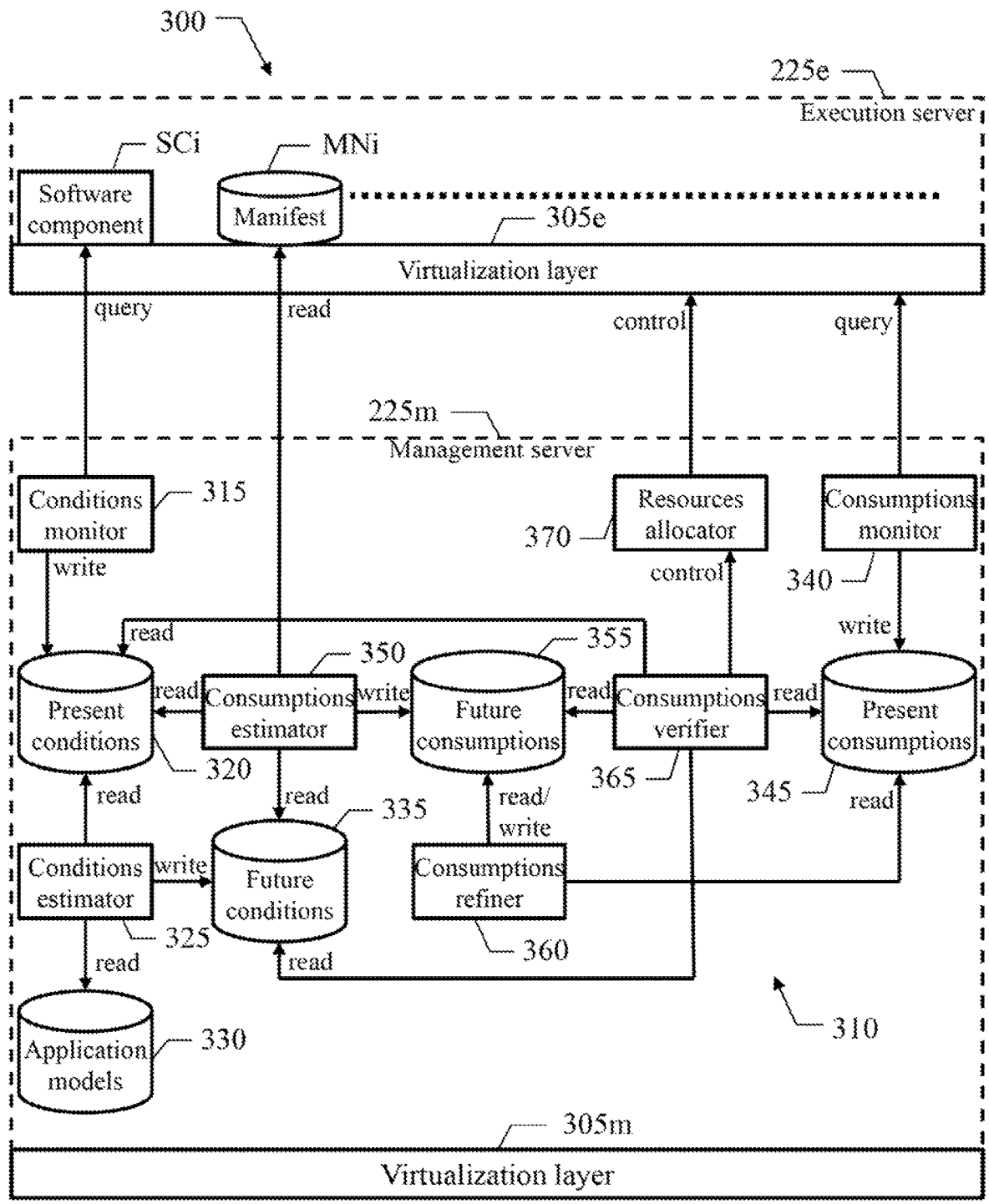
FIG. 3 shows the main software components that may be used to implement the solution according to an embodiment of the present disclosure.

Referring to FIG. 3, the main software components are shown that may be used to implement the solution according to an embodiment of the present disclosure.

Particularly, all the software components (programs and data) are denoted as a whole with the reference 300. The software components 300 are typically stored in the mass memories and loaded (at least in part) into the working memories of the servers when the programs are running. The programs are installed into the mass memories, for example, by reading from removable storage units and/or downloading from the network. In this respect, each program may be a module, segment or portion of code, which includes one or more executable instructions for implementing the specified logical function.

The software applications have their software components, denoted with SCi for the i-th software component, that are deployed on one or more (execution) servers, differentiated with the reference 225e. Each execution server 225e (only one shown in the figure) runs a virtualization layer 305e (for example, a hypervisor, an operating system and so on); the virtualization layer 305e provides virtual computing resources, which are mapped to corresponding physical computing resources of the execution server 225e (such as processing capability, working memory, mass-memory, network functionalities and so on). The software components SCi running on the execution server 225e are allocated dedicated (virtual) computing resources provided by the virtualization layer 305e. For example, the software components SCi may be containers (also known as zones or private servers), each emulating an (isolated) application environment running on a (shared) operating system (thanks to resource isolation features provided by it).

Each software component SCi has an associated manifest MNi. The manifest MNi stores metadata relating to the software component SCi (for example, used for its deployment, invocation, monitoring and so on). In the solution according to an embodiment of the present disclosure, the manifest MNi further stores a component model of the software component SCi. The component model defines a (resource) consumption of each computing resource by the software component SCi as a function of its condition (such as linear, exponential, polynomial, constant and so on). For example, the condition of the software component SCi is defined by its workload as indicated by one or more workload metrics (such as invocations frequency, HTTP requests frequency, responses frequency and so on). In addition, the condition may also be defined by an internal state of the software component SCi (such as a point in a corresponding flow diagram).

A resource manager 310 manages the allocation of the computing resources of the execution servers 225e to the software applications according to an embodiment of the present disclosure. The resource manager 310 runs on a (management) server, differentiated with the reference 225m, with a similar virtualization layer 305m; for example, the resource manager 310 runs in a dedicated Virtual Machine (VM) emulating a corresponding physical computing machine. The resource manager 310 includes the following software components.

A conditions monitor 315 monitors the condition of the software components SCi. The condition monitor 315 queries each software components SCi and it writes a present conditions repository 320. The present conditions repository 320 includes an entry for each software component SCi, which indicates a present condition thereof. For example, the entry stores a present value of each workload metric (present metric) of the software component SCi indicated in its component model; in addition, the entry may also store the internal state at which the software component SCi is presently (present internal state). A conditions estimator 325 estimates a future condition of each software component SCi. The conditions estimator 325 reads the present conditions repository 320 and an application models repository 330.

The application models repository 330 includes an entry for each software application, which stores an application model thereof. The application model defines the future condition of each software component SCi of the software application as a function of the present condition of all its software components SCi. Particularly, the application model defines a future value of each workload metric (future metric) of the software component SCi as a function of the present metrics of all the software components SCi. The application model is based on a trend of the invocations of the software components SCi over time in the software application (determined from its structure and/or from simulations); for example, when a first software component SCi generally invokes a second software component SCi, the workload of the first software component SCi is likely to be passed to the second software component SCi after a while. Particularly, the application model may be applied in three different modes (depending on a corresponding mode parameter). Particularly, the mode parameter may be set to "baseline", "minimum" or "maximum" to provide a baseline of the future value of each workload metric (baseline future metric) for a standard condition of the software component SCi, a minimum of the future value of each workload metric (minimum future metric) for a best condition of the software component SCi and a maximum of the future value of each workload metric (maximum future metric) for a worst condition of the software component SCi, respectively. For example, generally the trend of the invocations of the software component SCi gives rise to several possible scenarios; therefore, the standard condition may be defined by an average of the invocations of the software component SCi (in the most probable scenario or in a combination of the possible scenarios weighted according to their probability), the best condition may be defined by a minimum of the invocations of the software component SCi (in the scenario with the lowest possible invocations) and the worst condition may be defined by a maximum of the invocations of the software component SCi (in the scenario with the highest possible invocations).

The conditions estimator 325 writes a future conditions repository 335. The future conditions repository 335 includes an entry for each software component SCi, which indicates a future condition thereof; for example, the entry stores the baseline future metrics, the minimum future metrics and the maximum future metrics of the same workload metrics of the software component SCi in the present conditions repository 320. The entry further stores a previous version of the baseline future metrics (previous future metrics) that have been estimated previously for the present.

A consumptions monitor 340 monitors a consumption of the computing resources of the execution servers 225e by the software components SCi. The consumptions monitor 340 queries the virtualization layers 305e of the execution servers 225e. The consumption monitor 340 writes a present consumptions repository 345. The present consumptions repository 345 includes an entry for each software component SCi, which indicates a present value of the consumption (present consumption) of each computing resource by the software component SCi.

A consumptions estimator 350 estimates the consumption of the computing resources in the future by the software components SCi. The consumptions estimator 350 reads the present conditions repository 320, the future conditions repository 335 and the manifests MNi. The consumptions estimator 350 writes a future consumptions repository 355. The future consumptions repository 355 includes an entry for each software component SCi, which indicates a future value of the consumption (future consumption) of each computing resource by the software component SCi. Particularly, for each computing resource the entry includes a baseline of the future value of its consumption (baseline future consumption) for the standard condition of the software component SCi, a minimum of the future value of its consumption (minimum future consumption) for the best condition of the software component SCi and a maximum of the future value of its consumption (maximum future consumption) for the worst condition of the software component SCi. The entry further stores a previous version of the baseline future consumptions (previous future consumptions) that have been estimated previously for the present.

A consumptions refiner 360 refines the future consumptions of the software components SCi with a feedback mechanism. The consumptions refiner 360 reads the present consumptions repository 345 and its reads/writes the future consumptions repository 355. A consumptions verifier 365 verifies the (possibly refined) future consumptions of the software components SCi. The consumptions verifier 365 reads the present conditions repository 320, the future conditions repository 335, the present consumptions repository 345 and the future consumptions repository 355. The consumptions verifier 365 controls a resources allocator 370. The resources allocator 370 controls the allocation of the computing resources to the software components SCi. For this purpose, the resources allocator 370 controls the virtualization layers 305e of the execution servers 225e.

Figure 4A:
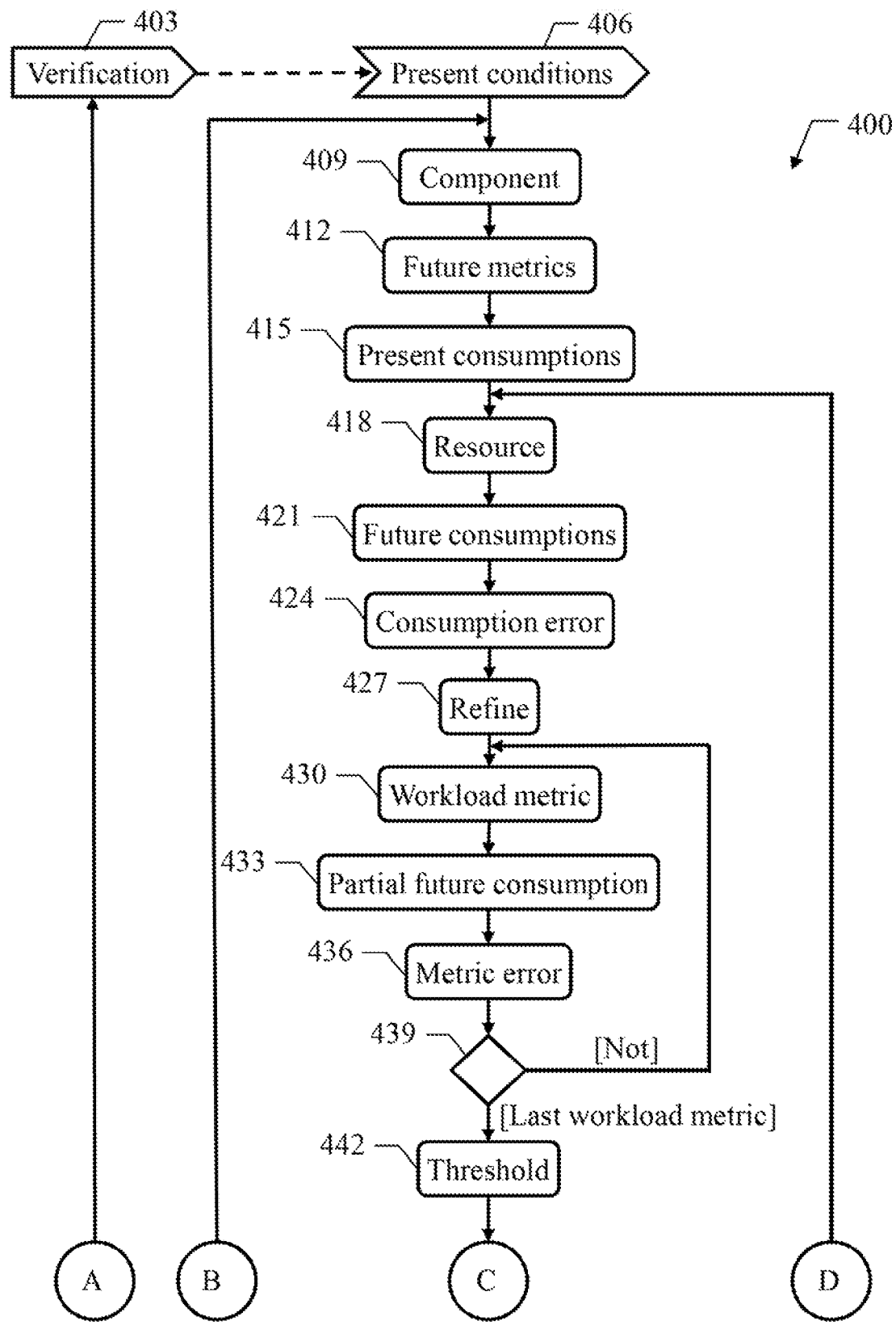
FIGS. 4A and 4B show an activity diagram describing the flow of activities relating to an implementation of the solution according to an embodiment of the present disclosure.
Figure 4B:
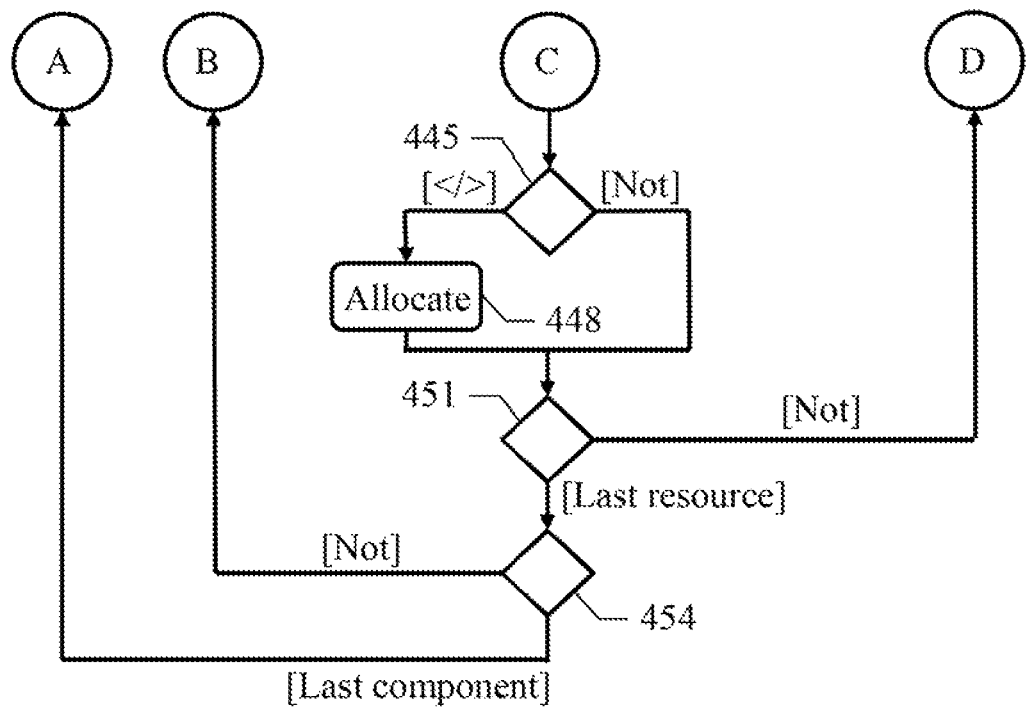

Referring to FIGS. 4A and 4B, an activity diagram is shown describing the flow of activities relating to an implementation of the solution according to an embodiment of the present disclosure.

Particularly, the activity diagram represents an exemplary process that may be used to manage the allocation of computing resources to a generic software application (including multiple software components) with a method 400. In this respect, each block may correspond to one or more executable instructions for implementing the specified logical function on each workstation.

The process passes from block 403 to block 406 whenever a (verification) event occurs triggering a verification of the allocation of the computing resources to the software application; for example, this happens periodically at corresponding verification instants (such as every 5-15 min.). In response thereto, the conditions monitor measures (or collects) the present metrics, and possibly the present internal states as well, of all the software components of the software application (defining their present conditions), denoted with WMi(j)_PRE for the i-th software component and the j-th workload metric; the conditions monitor then saves the present metrics WMi(j)_PRE into the corresponding repository (by replacing their previous version). A loop is then entered for processing the software components. The loop starts at block 409, wherein a (current) software component is taken into account (starting from a first one in any arbitrary order). The conditions estimator at block 412 estimates the baseline future metrics, the minimum future metrics and the maximum future metrics, and possibly the future internal states as well, of the software component (defining its future condition), denoted with WMi(j)_FUT, WMi(j)_FUTmin and WMi(j)_FUTmax, respectively. The baseline future metrics WMi(j)_FUT, the minimum future metrics WMi(j)_FUTmin and the maximum future metrics WMi(j)_FUTmax are estimated by applying the application model of the software application MOD_APP to the present metrics $WM\forall i(\forall j)\_PRE$ of all the software components (retrieved from the corresponding repositories) with the mode parameter set to "baseline", "minimum" and "maximum", respectively:

$$WMi(j)\_FUT=MOD\_APP(WM\forall i(\forall j)\_PRE, \text{``baseline''}),$$

$$WMi(j)\_FUT\ min=MOD\_APP(WM\forall i(\forall j)\_PRE, \text{``minimum''}),$$

$$WMi(j)\_FUT\ max=MOD\_APP(WM\forall i(\forall j)\_PRE, \text{``maximum''});$$

the conditions estimator saves these values into the future conditions repository, after shifting the future baseline metrics estimated at a previous verification instant that replace their version estimated at a still previous verification instant, thereby becoming the previous future metrics, denoted with WMi(j)_FUT[−4]. The consumptions monitor at block 415 measures (or collects) the present consumptions of the computing resources of all the software components of the software application, denoted with RCi(k)_RE for the i-th software component and the k-th computing resource; the consumptions monitor then save the present consumptions RCi(k)_RE into the corresponding repository (by replacing their previous version).

A further loop is now entered for processing the computing resources of the software component. The loop starts at block 418, wherein a (current) computing resource is taken into account (starting from a first one in any arbitrary order). The consumptions estimator at block 421 estimates the baseline future consumption, the minimum future consumption and the maximum future consumption of the computing resource by the software component (defining its future consumption), denoted with RCi(k)_FUT, RCi(k)_FUTmin and RCi(k)_FUTmax, respectively.

The baseline future consumption RCi(k)_FUT, the minimum future consumption RCi(k)_FUTmin and the maximum future consumption RCi(k)_FUTmax are estimated by applying the component model of the software component MOD_OMi (retrieved from the corresponding manifest) to the baseline future metrics WMi($\forall$j)_UT, the minimum future metrics WMi($\forall$j)_FUTmin and the maximum future metrics WMi($\forall$j)_FUTmax, respectively (retrieved from the corresponding repository):

$RCi(k)\_FUT=MOD\_COMi(WMi(\forall j)\_FUT),$ $RCi(k)\_FU Tmin=MOD\_COMi(WMi(\forall j)\_FUTmin),$ $RCi(k)\_FUT max=MOD\_COMi(WMi(\forall j)\_FUTmax);$ the consumption estimator saves these values into the future consumptions repository, after shifting the future baseline consumption estimated at a previous verification instant that replaces its version estimated at a still previous verification instant, thereby becoming the previous future consumption of the computing resource, denoted with RCi(k)_FUT[−1].

The consumption refiner at block 424 calculates a (consumption) error ERRi(k) of the estimation of the previous future consumption RCi(k)_FUT[−1], performed at the previous verification instant for the present verification instant, with respect to the present consumption RCi(k)_PRE, representing its actual value measured at the present verification instant (retrieved from the corresponding repositories):

$ERRi(k)=RCi(k)\_FUT[-1]-RCi(k)\_PRE.$

The consumption refiner at block 427 refines the minimum future consumption RCi(k)_FUTmin and the maximum consumption metrics RCi(k)_FUTmin by comparing them with the baseline future consumption metric RCi(k)_FUT updated according to the consumption error ERRi(k):

$RCi(k)\_FUT\ min=min[RCi(k)\_FUT\ min,\ RCi(k)\_FUT-ERRi(k)],$ $RCi(k)\_FUT\ max=max[RCi(k)\_FUT\ max,\ RCi(k)\_FUT+ERRi(k)].$ A further loop is entered for calculating corresponding (metric) errors ERRi(k,j) of the estimation (for the i-th software component) of the future consumption of the k-th computing resource (being performed at the previous verification instant for the present verification instant) as depending only on the j-th workload metric. The loop starts at block 430, wherein the consumption verifier takes a (current) workload metric into account (starting from a first one in any arbitrary order). In this phase, the consumption verifier may also filter the workload metrics to be taken into account according to their correlation with the consumption of the computing resource. Particularly, the workload metrics are classified into a relevant class (significantly contributing to the consumption of the computing resource) and a non-relevant class (non-significantly contributing to the consumption of the computing resource), for example, with a Linear Discriminant Analysis (based on a training set derived from historical data of the workload metrics and their metric errors); the processing is then limited to the relevant metrics only. This allows reducing the computational complexity without adversely affecting the reliability. In any case, the consumption verifier at block 433 estimates a partial future consumption RCi(k,j)_FUT for the present verification instant (for the k-th computing resource of the i-th software component) as depending only on this j-th workload metric.

The partial future consumption RCi(k,j)_FUT is estimated by applying the component model of the software component MOD_COMi (retrieved from the corresponding manifest) to the previous future metric WMi(j)_FUT[−1] of the j-th workload metric (estimated for the present verification instant at the previous verification instant) and to the present metrics WMi(j')_PRE (with j'≠j) of the other workload metrics different from it (equal to their actual values measured at the present verification instant):

$RCi(k,j)\_FUT[-1]=MOD\_COMi(WMi(j)\_FUT[-1],\ WMi(j')\_PRE).$

The consumption verifier at block 436 calculates the metric error ERRi(k,j) of the partial future consumption RCi(k,j)_FUT[−1], estimated for the present verification instant, with respect to the present consumption RCi(k_PRE, representing its actual value measured at the present verification instant (retrieved from the corresponding repository)

$ERRi(k,j)=RCi(kj)\_FUT[-4]-RCi(k)\_PRE.$

A test is made at block 439, wherein the consumption verifier verifies whether a last workload metric has been processed. If not, the flow of activity returns to block 430 to repeat the same operations on a next workload metric. Conversely (once all the workload metrics have been processed), the loop is exit by descending into block 442.

At this point, the consumption verifier calculates a (low) verification threshold TH1$i$(k) and a (high) verification threshold TH2$i$(k) according to the metric errors ERRi(k,$\forall$j) of all the workload metrics (of the i-th software component for the k-th computing resource); for example, the verification thresholds TH1$i$(k),TH2$i$(k) are set to a scaled sum of the metric errors ERRi(k,$\forall$j):

$TH1i(k)=SC1 \cdot \Sigma_j ERRi(k,j)$ $TH2i(k)=SC2 \cdot \Sigma_j ERRi(k,j).$ wherein SC1 is a (low) scaling factor and SC2 is a (high) scaling factor. The scaling factor SC2 is strictly higher than the scaling factor SC1 (so that the verification threshold TH2$i$ is strictly higher than the verification threshold TH1$i$). For example, the scaling factor SC2 is set to 0.6-0.8, preferably 0.7 and the scaling factor SC1 is set to 0.2-0.4, preferably 0.3.

The flow of activity branches at block 445 according to a comparison of the (possibly refined) minimum future consumption RCi(k)_FUTmin and maximum future consumption RCi(k)_FUTmax with the verification threshold TH1$i$ and the verification threshold TH2$i$, respectively. Particularly, if both the minimum future consumption RCi(k)_FUTmin is (possibly strictly) lower than the verification threshold TH1$i$ and the maximum future consumption RCi(k)_FUTmax is (possibly strictly) higher than the verification threshold TH2$i$, the process descends into block 448. This means that the estimation of both the minimum future consumption RCi(k)_FUTmin and the maximum future consumption RCi(k)_FUTmax are accurate. Therefore, the resource allocator allocates the computing resource to the software component accordingly; for example, the resource allocator allocates the computing resource to a range between the minimum future consumption RCi(k)_FUTmin and the maximum future consumption RCi(k)_FUTmax.

The process then continues to block 451; the same point is also reached directly from the block 445 (without affecting the allocation of the computing resource to the software component) if the minimum future consumption RCi(k)_FUTmin is (possibly strictly) higher than the verification threshold TH1$i$ and/or the maximum future consumption RCi(k)_FUTmax is (possibly strictly) lower than the verification threshold TH2$i$ (meaning that at least one of them is not accurate).

At this point, the consumption verifier verifies whether a last computing resource has been processed. If not, the flow of activity returns to block 418 to repeat the same operations on a next computing resource. Conversely (once all the computing resources have been processed), the loop is exit by descending into block 454. The condition estimator now verifies whether a last software component has been processed. If not, the flow of activity returns to block 409 to repeat the same operations on a next software component. Conversely (once all the software components have been processed), the loop is exit by returning to the block 403 waiting for a next verification event.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (including its end points). Ordinal or other qualifiers are merely used as labels to distinguish elements with the same name but do not by themselves connote any priority, precedence or order. The terms include, include, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for resource management of a software application. However, the software application may be of any type (for example, application software, middleware software, system software and the like, running in any environment, such as cloud, client/server, stand-alone and the like, and so on).

In an embodiment, the software application includes a plurality of software components interacting with each other. However, the software components may be in any number and of any type (for example, services, modules, jobs and so on).

In an embodiment, the method includes the following steps under the control of a computing system. However, the computing system may be of any type (for example, a dedicated virtual/physical machine, the same virtual/physical machine wherein some of the software components (up to all of them) run, and so on).

In an embodiment, the method includes monitoring (by the computing system) corresponding present conditions of the software components. However, the present conditions of the software components may be defined in any way (for example, by any workload metrics, any internal state, their combination and so on) and they may be monitored in any way (for example, by measuring at any verification instant, by measuring continually during each verification period (such as every 10-30 s) and then calculating corresponding average values over the last verification period at each verification instant, and so on).

In an embodiment, the method includes estimating (by the computing system for each of the software components) corresponding future consumptions of one or more computing resources each indicative of a future value of a consumption of the corresponding computing resource by the software component. However, the computing resources may be of any computing system (for example, one or more physical/virtual servers, and so on), in any number and of any type (for example, partial, different and additional computing resources with respect to the ones mentioned above, of virtual and/or physical type, and so on); moreover, their future consumptions may be defined in any way (for example, absolute values, percentages and so on).

In an embodiment, the future consumptions of the software component are estimated from the present conditions of the software components according to at least one estimation model. However, the estimation models may be in any number (for example, an application model for the whole software application and corresponding components models for the software components, a single global model or corresponding individual models for the software components cumulating their logics, and so on) and of any type (for example, analytic, discrete and the like, explicit or implicit, such as embedded in corresponding neural networks, and so on).

In an embodiment, the method includes controlling (by the computing system) an allocation of the computing resources to the software components according to the corresponding future consumptions. However, the allocation may be controlled in any way (for example, increasing/reducing the computing resources, adding/removing instances of the software components, re-staging the software application and so on) according to the future consumptions (for example, according to absolute values, relative values with respect to the present consumptions, and so on).

Further embodiments provide additional advantageous features, which may however be omitted at all in a basic implementation.

Particularly, in an embodiment the method includes monitoring (by the computing system for each of the software components) the present condition of the software component including corresponding present metrics of one or more workload metrics of the software component each indicative of a present value of the corresponding workload metric. However, the workload metrics may be in any number and of any type (for example, partial, different and additional workload metrics with respect to the ones mentioned above) and their present values may be defined in any way (for example, absolute values, percentages and so on).

In an embodiment, said at least one estimation model includes an application model of the software application and corresponding component models of the software components. However, the application model and the component models may be of any type (either the same or different to each other).

In an embodiment, the method includes estimating (by the computing system) corresponding future conditions of the software components. However, the future conditions may be defined in any way (either the same or different with respect to the present conditions).

In an embodiment, the future conditions of each of the software components are estimated from the present conditions of the software components according to the application model. However, the application model may be of any type (for example, based on the present conditions of the software components, on a present internal state of the software application, on the present internal states of the software components, on any combination thereof and so on).

In an embodiment, the method includes estimating (by the computing system for each of the software components) the future consumptions of the software component from the future condition of the software component according to the component model of the software component. However, the component model may be of any type (for example, based on the future condition, on the future internal state, on both of them and so on); in any case, the possibility of estimating the future consumptions of the software components directly from their present conditions is not excluded.

In an embodiment, the method includes reading (by the computing system for each of the software components) the component model from a manifest of the software component. However, the manifest may be of any type (for example, XML, text and so on), it may be provided in any way (for example, stored together with the software component, published in a central repository and so on) and it may be read in any way (for example, directly, via a remote command and so on); in any case, the possibility is not excluded of providing the component model in a different way, even independently of the manifest, if any, of the software component.

In an embodiment, the method includes measuring (by the computing system for each of the software components) corresponding present consumptions of the computing resources each indicative of a present value of the consumption of the corresponding computing resource by the software component. However, the present consumptions may be of any type (either the same or different with respect to the future consumptions) and they may be measured in any way (for example, only once at any verification instant, two to more times around it and then calculating corresponding average values, and so on).

In an embodiment, the method includes calculating (by the computing system for each of the software components) corresponding estimation errors of the computing resources. However, the estimation errors may be of any type (for example, for each computing resource a single consumption error, corresponding metric errors for the workload metrics, any combination thereof, and so on).

In an embodiment, the estimation error of each of the computing resources is estimated according to the present consumption and a previous future consumption consisting of the future consumption being previously estimated. However, the estimation error may be estimated in any way (for example, according to any comparison between the present consumption and the baseline future consumption, between the present consumption and the partial future consumptions of the workload metrics, and so on).

In an embodiment, the method includes controlling (by the computing system) the allocation of the computing resources to the software components further according to the corresponding estimation errors. However, the allocation may be controlled according to the estimation errors in any way (for example, by using the estimation errors to refine the future consumptions, to trigger the allocation of the computing resources, any combination thereof and so on).

In an embodiment, the method includes refining (by the computing system for each of the software components) the future consumption of each of the computing resources according to the estimation error of the computing resource. However, the future consumptions may be refined in any way (for example, by updating the minimum/maximum future consumptions, the baseline future consumption, any combination thereof and so on).

In an embodiment, the method includes estimating (by the computing system for each of the software components) the future consumptions of the computing resources including corresponding baseline future consumptions, minimum future consumptions and maximum future consumptions. However, the baseline/minimum/maximum future consumptions may be estimated in any way (for example, from baseline/minimum/maximum future conditions estimated from the present conditions, directly from the present conditions and so on).

In an embodiment, the baseline future consumption, the minimum future consumption and he maximum future consumption of each of the computing resources are indicative of a baseline, a minimum and a maximum, respectively, of the future value of the consumption of the corresponding computing resource. However, the baseline/minimum/maximum of the future value of the consumption may be defined in any way (for example, with the baseline corresponding to the mean, the mode, the modal, the minimum/maximum corresponding to the highest/lowest, with or without spikes filtering and so on).

In an embodiment, the method includes calculating (by the computing system for each of the software components) the estimation errors including corresponding consumption errors; the consumption error of each of the computing resources is calculated according to a difference between the present consumption of the computing resource and a previous future consumption of the computing resource (consisting of the baseline future consumption of the computing resource being previously estimated). However, the consumption error may be calculated in any way (for example, in absolute terms, in relative terms with respect the present consumption and so on).

In an embodiment, the method includes refining (by the computing system for each of the software components) the minimum future consumption and the maximum future consumption of each of the computing resources according to the baseline future consumption and the consumption error of the computing resource. However, the minimum/maximum future consumptions may be refined in any way (for example, by comparing them with the baseline future consumption updated according to the consumption error, by updating them directly according to a percentage of the consumption error and so on).

In an embodiment, the method includes setting (by the computing system for each of the software components) the minimum future consumption of each of the computing resources to a minimum between the minimum future consumption and the baseline future consumption minus the consumption error of the computing resource. However, the possibility is not excluded of comparing the minimum future consumption with the baseline future consumption updated in any other way according to the consumption error (for example, subtracting or dividing by the consumption error or any percentage thereof, and so on).

In an embodiment, the method includes setting (by the computing system for each of the software components) the maximum future consumption of each of the computing resources to a maximum between the maximum future consumption and the baseline future consumption plus the consumption error of the computing resource. However, the possibility is not excluded of comparing the maximum future consumption with the baseline future consumption updated in any other way according to the consumption error (for example, adding or multiplying by the consumption error or any percentage thereof, and so on).

In an embodiment, the method includes triggering (by the computing system for each of the software component) the controlling of the allocation of each of the computing resources according to a comparison of the future consumption of the computing resource with one or more corresponding verification thresholds based on the estimation error of the computing resource. However, the verification thresholds may be in any number and based on the estimation error in any way (for example, calculated from the corresponding metric errors, consumption error, any combination thereof and so on); the allocation may be triggered according to any comparison of the future consumption with the verification thresholds (for example, by comparing the minimum future consumption, the maximum future consumption, the baseline future consumption, any combination thereof, as soon as corresponding conditions are satisfied or only after this happens for two or more verification instants, and so on).

In an embodiment, the method includes estimating (by the computing system for each of the software components) corresponding future metrics for the workload metrics each indicative of a future value of the corresponding workload metric of the software component. However, the future metrics may be of any type (either the same or different with respect to the present metrics).

In an embodiment, the future metric of each of the workload metrics of the software component is estimated from the present metrics of the workload metric of the software components according to said at least one estimation model. However, the future metric may be estimated in any way (for example, with or without taking into account the internal states of the software components, the present metrics of one or more other workload metrics, and so on).

In an embodiment, the method includes estimating (by the computing system for each of the software components), for each of the computing resources, corresponding partial future consumptions for the workload metrics. However, the partial future consumptions may be in any number (for example, for all the workload metrics or only part thereof, and so on) and of any type (for example, either the same or different with respect to the future consumptions, and so on).

In an embodiment, the partial future consumption of each of the workload metrics is estimated from a previous future metric of the workload metric (consisting of the future metric of the workload metric being previously estimated) and the present metrics of any other workload metrics according to said at least one estimation model. However, the partial future consumption may be estimated in any way (for example, with or without taking into account the internal states of the software applications, and so on).

In an embodiment, the method includes calculating (by the computing system for each of the software components) the estimation error of each of the computing resources comprising corresponding metric errors for the workload metrics; the metric error of each of the workload metric is calculated according to a difference between the present consumption of the computing resource and the partial future consumption of the workload metric for the computing resource. However, the metric errors may be calculated in any way (for example, in absolute terms, in relative terms with respect the present consumption and so on).

In an embodiment, the method includes setting (by the computing system for each of the software component) the verification thresholds of each of computing resources according to the metric errors of the computing resource. However, the verification thresholds may be in any number (for example, one for the minimum future consumption and another one for the maximum future consumption, a single one for both of them and so on) and they may be set according to the metric errors in any way (for example, by summing, multiplying and the like the metric errors, with or without weighing the metric errors, with or without applying any scaling factor, and so on).

In an embodiment, the method includes triggering (by the computing system for each of the software component) the controlling of the allocation of each of the computing resources in response to the minimum future consumption of the computing resource being lower than a low one of the verification thresholds and the maximum future consumption of the computing resource being higher than a high one of the verification thresholds higher than the low verification threshold. However, the allocation may be triggered according to any comparison of the minimum/maximum future consumption with any verification thresholds (for example, when the corresponding conditions are satisfied by both the minimum future consumption and the maximum future consumption, by only one of them, and so on).

In an embodiment, the method includes setting (by the computing system for each of the software component) the low verification threshold and the high verification threshold of each of the computing resources to a sum of the workload metrics of the computing resource multiplied by a low scaling factor and a high scaling factor, respectively (the high scaling factor being higher than the low scaling factor). However, the low/high scaling factors may have any value (either in absolute or relative terms).

In an embodiment, the software application is a cloud software application. However, the cloud software application may be of any type (for example, IaaS, PaaS, SaaS or NaaS, public, hybrid or private, and so on).

In an embodiment, the software components implement corresponding services. However, the services may be of any type (for example, standard, micro, nano and so on services).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program that is configured for causing a computing system to perform the above-mentioned method. An embodiment provides a computer program product, which includes a computer readable storage medium that has program instructions embodied therewith; the program instructions are executable by a computing system to cause the computing system to perform the same method. However, the computer program may be implemented as a stand-alone module, as a plug-in for a pre-existing software application (for example, a cloud manager) or directly therein. Moreover, the computer program may be executed on any computing system (see below). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a system including means that are configured for performing the steps of the above-described method. An embodiment provides a system including a circuit (i.e., any hardware suitably configured, for example, by software) for performing each step of the above-described method. However, the system may include any number and type of computing machines (for example, of physical and/or virtual type) and it may have any architecture (stand-alone or distributed with the computing machines communicating among them via any local, wide area, global, cellular or satellite network and exploiting any type of wired and/or wireless connections).

Generally, similar considerations apply if the system has a different structure or includes equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a normalized search engine or related data available in the cloud. For example, the normalized search engine could execute on a computing system in the cloud and execute normalized searches. In such a case, the normalized search engine could normalize a corpus of information and store an index of the normalizations at a storage location in the cloud. Doing so allows a user to access this information from any computing system attached to a network connected to the cloud (e.g., the Internet).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure including a network of interconnected nodes.

Figure 5:
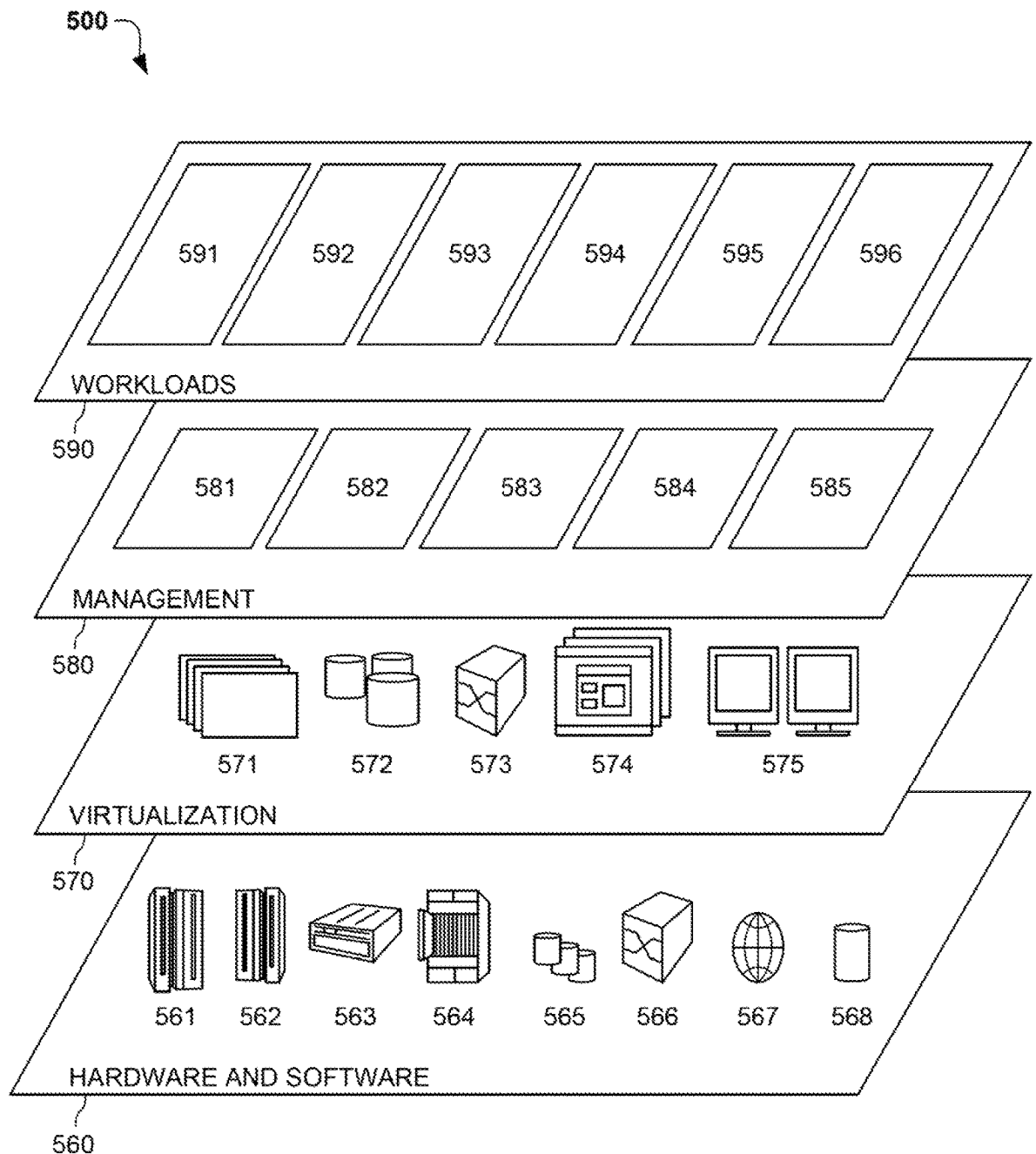
FIG. 5 depicts a cloud computing environment according to an embodiment of the present invention.

Referring now to FIG. 5, a set of functional abstraction layers provided by cloud computing provider 205 (as shown in FIG. 2) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572, for example the storage units 240 as shown in FIG. 1; virtual networks 573, including virtual private networks; virtual applications and operating systems 574; and virtual clients 575.

In an example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In an example, these resources may include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and resource management 596. The resource management 596 may relate allocate resource amongst software components.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claims is:

1. A method for resource management of a software application comprising a plurality of software components interacting with each other, the method comprising:

monitoring, by a computing system for each of the plurality of software components, a present condition of the software component comprising corresponding present metrics of one or more workload metrics of the software component each indicative of a present value of a corresponding workload metric;

estimating, by the computing system for each of the plurality of software components, corresponding future metrics for the workload metrics each indicative of a future value of the corresponding workload metric of the software component, a future metric of each of the workload metrics of the software component being estimated from the present metrics of the workload metric of the software components according to at least one estimation model;

estimating, by the computing system for each of the plurality of software components, corresponding future consumptions of one or more computing resources each indicative of a future value of a consumption of the corresponding computing resource by the software component, the future consumptions of the software component being estimated from present conditions of the software components according to at least one estimation model;

estimating, by the computing system for each of the plurality of software components, for each of computing resources corresponding partial future consumptions for the workload metrics, the partial future consumption of each of the workload metrics being estimated from a previous future metric of the workload metric, consisting of a future metric of a workload metric being previously estimated, and present metrics of any other workload metrics according to at least one estimation model;

calculating, by the computing system for each of the plurality of software components, an estimation error of each of the computing resources comprising corresponding metric errors for the workload metrics, the metric error of each of the workload metric being calculated according to a difference between the present consumption of the computing resource and the partial future consumption of the workload metric for the computing resource;

setting, by the computing system for each of the software component, verification thresholds of each of computing resources according to metric errors of the computing resource;

controlling, by the computing system, an allocation of the computing resources to the software components according to the corresponding future consumptions; and triggering, by the computing system for each of the plurality of software components, the controlling of the allocation of each of the computing resources according to a comparison of the future consumption of the computing resource with one or more corresponding verification thresholds based on the estimation error of the computing resource.

2. The method according to claim 1, further comprising:
estimating, by the computing system for each of the plurality of software components, the future consumptions of the computing resources comprising corresponding minimum future consumptions and maximum future consumptions, the minimum future consumption and the maximum future consumption of each of the computing resources being indicative of a minimum and a maximum, respectively, of the future value of consumption of the corresponding computing resource; and triggering, by the computing system for each of the plurality of software component, the controlling of allocation of each of the computing resources in response to the minimum future consumption of the computing resource being lower than a low one of the verification thresholds and the maximum future consumption of the computing resource being higher than a high one of the verification thresholds higher than the low verification threshold.

3. The method according to claim 2, further comprising:
setting, by the computing system for each of the plurality of software component, the low verification threshold and the high verification threshold of each of the computing resources to a sum of workload metrics of the computing resource multiplied by a low scaling factor and a high scaling factor, respectively, the high scaling factor being higher than the low scaling factor.

4. The method according to claim 1, wherein the at least one estimation model comprises an application model of the software application and corresponding component models of the plurality of software components, the method further comprising:

estimating, by the computing system, corresponding future conditions of the plurality of software components, the future condition of each of the software components being estimated from the present conditions of the software components according to the application model; and estimating, by the computing system for each of the plurality of software components, the future consumptions of the software component from the future condition of the software component according to the component model of the software component.

5. The method according to claim 4, further comprising:
reading, by the computing system for each of the plurality of software components, the component model from a manifest of the software component.

6. The method according to claim 1, further comprising:
measuring, by the computing system for each of the plurality of software components, corresponding present consumptions of the computing resources each indicative of a present value of the consumption of the corresponding computing resource by the software component;

calculating, by the computing system for each of the plurality of software components, corresponding estimation errors of the computing resources, the estimation error of each of the computing resources being estimated according to present consumption and a previous future consumption consisting of future consumption being previously estimated; and controlling, by the computing system, the allocation of the computing resources to the plurality of software components further according to the corresponding estimation errors.

7. The method according to claim 6, further comprising:
refining, by the computing system for each of the plurality of software components, future consumption of each of the computing resources according to the estimation error of the computing resource.

8. The method according to claim 7, further comprising:
estimating, by the computing system for each of the plurality of software components, the future consumptions of the computing resources comprising corresponding baseline future consumptions, minimum future consumptions and maximum future consumptions, the baseline future consumption, a minimum future consumption and a maximum future consumption of each of the computing resources being indicative of a baseline, a minimum and a maximum, respectively, of the future value of the consumption of the corresponding computing resource;

calculating, by the computing system for each of the plurality of software components, the estimation errors comprising corresponding consumption errors, the consumption error of each of the computing resources being calculated according to a difference between a present consumption of the computing resource and a previous future consumption of the computing resource consisting of the baseline future consumption of the computing resource being previously estimated; and refining, by the computing system for each of the plurality of software components, the minimum future consumption and the maximum future consumption of each of the computing resources according to the baseline future consumption and the consumption error of the computing resource.

9. The method according to claim 8, further comprising:
setting, by the computing system for each of the plurality of software components, the minimum future consumption of each of the computing resources to a minimum between the minimum future consumption and the baseline future consumption minus the consumption error of the computing resource; and
setting, by the computing system for each of the plurality of software components, the maximum future consumption of each of the computing resources to a maximum between the maximum future consumption and the baseline future consumption plus the consumption error of the computing resource.

10. The method according to claim 1, wherein the software application is a cloud software application and a plurality of software components implement corresponding services.

11. A computer program product for resource management of a software application comprising a plurality of software components interacting with each other, the computer program product comprising:
one or more computer readable tangible storage medium and program instructions stored on at least one of the one or more computer tangible readable storage medium, the program instructions executable by a computing system to cause the computing system to perform a method comprising:
monitoring, by the computing system for each of the plurality of software components, a present condition of the software component comprising corresponding present metrics of one or more workload metrics of the software component each indicative of a present value of a corresponding workload metric;
estimating, by the computing system for each of the plurality of software components, corresponding future metrics for the workload metrics each indicative of a future value of the corresponding workload metric of the software component, a future metric of each of the workload metrics of the software component being estimated from the present metrics of the workload metric of the software components according to at least one estimation model;
estimating, by the computing system for each of the plurality of software components, corresponding future consumptions of one or more computing resources each indicative of a future value of a consumption of the corresponding computing resource by the software component, the future consumptions of the software component being estimated from present conditions of the software components according to at least one estimation model;
estimating, by the computing system for each of the plurality of software components, for each of the computing resources corresponding partial future consumptions for the workload metrics, the partial future consumption of each of the workload metrics being estimated from a previous future metric of the workload metric, consisting of a future metric of the workload metric being previously estimated, and the present metrics of any other workload metrics according to at least one estimation model;
calculating, by the computing system for each of the plurality of software components, an estimation error of each of the computing resources comprising corresponding metric errors for the workload metrics, the metric error of each of the workload metric being calculated according to a difference between the present consumption of the computing resource and the partial future consumption of the workload metric for the computing resource;
setting, by the computing system for each of the software component, verification thresholds of each of computing resources according to the metric errors of the computing resource;
controlling, by the computing system, an allocation of the computing resources to the software components according to the corresponding future consumptions; and
triggering, by the computing system for each of the plurality of software components, the controlling of the allocation of each of the computing resources according to a comparison of the future consumption of the computing resource with one or more corresponding verification thresholds based on the estimation error of the computing resource.

12. The computer program product according to claim 11, further comprising:
estimating, by the computing system for each of the plurality of software components, the future consumptions of the computing resources comprising corresponding minimum future consumptions and maximum future consumptions, a minimum future consumption and the maximum future consumption of each of the computing resources being indicative of a minimum and a maximum, respectively, of the future value of consumption of the corresponding computing resource; and
triggering, by the computing system for each of the plurality of software component, the controlling of allocation of each of the computing resources in response to the minimum future consumption of the computing resource being lower than a low one of the verification thresholds and the maximum future consumption of the computing resource being higher than a high one of the verification thresholds higher than the low verification threshold.

13. The computer program product according to claim 12, further comprising:
setting, by the computing system for each of the plurality of software component, the low verification threshold and the high verification threshold of each of the computing resources to a sum of workload metrics of the computing resource multiplied by a low scaling factor and a high scaling factor, respectively, the high scaling factor being higher than the low scaling factor.

14. A computer system for resource management of a software application comprising a plurality of software components interacting with each other, the computer system comprising:
one or more computer processors, one or more computer-readable storage media, and program instructions stored on the one or more of the computer-readable storage media for execution by at least one of the one or more processors, wherein the computer system is capable of performing a method comprising:
monitoring, by the computing system for each of the plurality of software components, a present condition of the software component comprising corresponding present metrics of one or more workload metrics of the software component each indicative of a present value of the corresponding workload metric;
estimating, by the computing system for each of the plurality of software components, corresponding future metrics for the workload metrics each indicative of a future value of the corresponding workload metric of the software component, a future metric of each of the workload metrics of the software component being estimated from the present metrics of the workload metric of the software components according to at least one estimation model;

estimating, by the computing system for each of the plurality of software components, corresponding future consumptions of one or more computing resources each indicative of a future value of a consumption of the corresponding computing resource by the software component, the future consumptions of the software component being estimated from present conditions of the software components according to at least one estimation model;

estimating, by the computing system for each of the plurality of software components, for each of the computing resources corresponding partial future consumptions for the workload metrics, the partial future consumption of each of the workload metrics being estimated from a previous future metric of the workload metric, consisting of a future metric of the workload metric being previously estimated, and the present metrics of any other workload metrics according to said at least one estimation model;

calculating, by the computing system for each of the plurality of software components, an estimation error of each of the computing resources comprising corresponding metric errors for the workload metrics, the metric error of each of the workload metric being calculated according to a difference between the present consumption of the computing resource and the partial future consumption of the workload metric for the computing resource; and setting, by the computing system for each of the software component, verification thresholds of each of computing resources according to metric errors of the computing resource;

controlling, by the computing system, an allocation of the computing resources to the software components according to the corresponding future consumptions; and triggering, by the computing system for each of the plurality of software components, the controlling of the allocation of each of the computing resources according to a comparison of the future consumption of the computing resource with one or more corresponding verification thresholds based on the estimation error of the computing resource.

15. The computer system according to claim 14, further comprising:

estimating, by the computing system for each of the plurality of software components, the future consumptions of the computing resources comprising corresponding minimum future consumptions and maximum future consumptions, minimum future consumption and maximum future consumption of each of the computing resources being indicative of a minimum and a maximum, respectively, of the future value of consumption of the corresponding computing resource; and triggering, by the computing system for each of the plurality of software component, the controlling of allocation of each of the computing resources in response to the minimum future consumption of the computing resource being lower than a low one of the verification thresholds and the maximum future consumption of the computing resource being higher than a high one of the verification thresholds higher than the low verification threshold.

16. The computer system according to claim 14, further comprising:

setting, by the computing system for each of the plurality of software component, the low verification threshold and the high verification threshold of each of the computing resources to a sum of workload metrics of the computing resource multiplied by a low scaling factor and a high scaling factor, respectively, the high scaling factor being higher than the low scaling factor.

* * * * *